March 29, 1955 — R. E. RISLEY — 2,705,158
ELECTRICALLY INSULATED PIPE SADDLE COUPLING
Filed Oct. 12, 1950 — 2 Sheets-Sheet 1

INVENTOR.
ROGER E. RISLEY
BY
ATTORNEY

March 29, 1955
R. E. RISLEY
2,705,158
ELECTRICALLY INSULATED PIPE SADDLE COUPLING
Filed Oct. 12, 1950
2 Sheets-Sheet 2
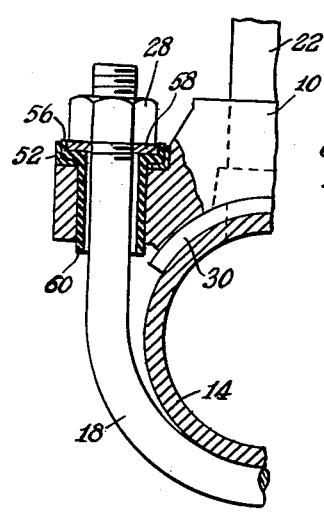
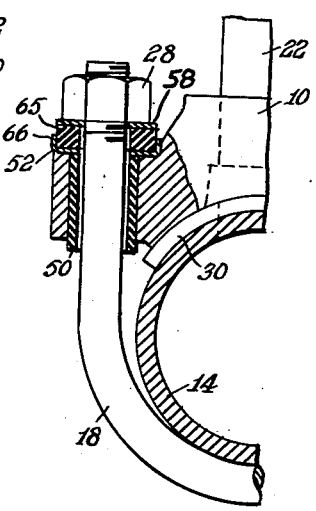
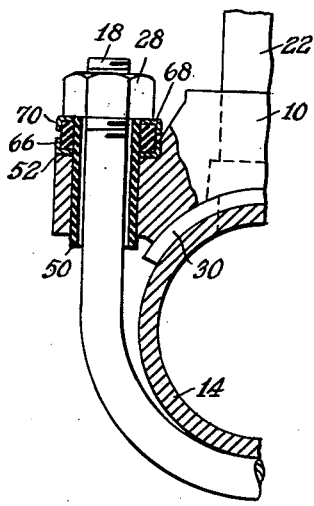
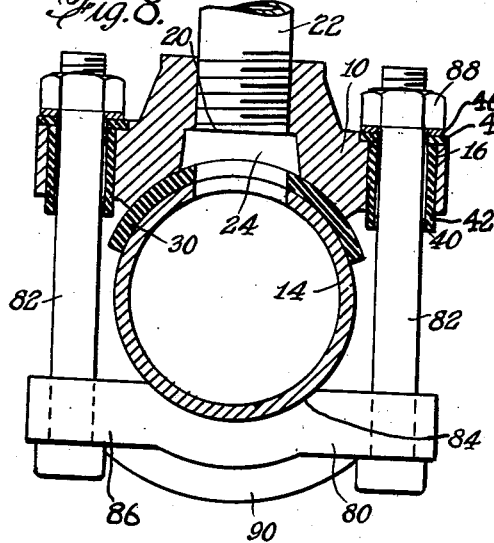
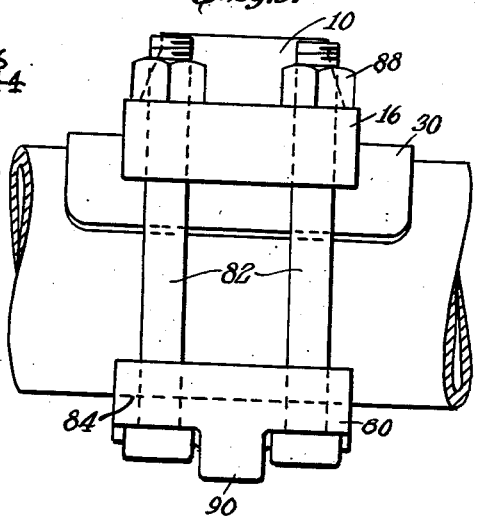
INVENTOR.
ROGER E. RISLEY
BY
*Robert E. Burns*
ATTORNEY.

United States Patent Office 2,705,158
Patented Mar. 29, 1955

2,705,158

ELECTRICALLY INSULATED PIPE SADDLE COUPLING

Roger E. Risley, Bradford, Pa., assignor to Dresser Industries, Inc., Dallas, Tex., a corporation of Pennsylvania Application October 12, 1950, Serial No. 189,764

2 Claims. (Cl. 285—14)

This invention relates to pipe fittings and is more particularly concerned with a pipe saddle of the type employed for connecting a branch line to a main pipe line, as in the distribution of gas and like fluids.

In the installation and use of pipe lines for the distribution of gas, water, oil and the like, when it is desired to attach a branch pipe line of smaller diameter to a main line, particularly when the differences between the diameters of the branch line and the main line are great, a fitting known as a "saddle" is commonly employed. A saddle may be applied either at the time the main line is being installed or may be used to attach a new branch line to an existing main line and is, therefore, of general utility. Saddles generally comprise a main body portion in the form of a block of metal having a curved inner face adapted to engage the side wall of the main line pipe section. The body portion is provided with a threaded aperture in which the branch line is received, and means are provided for drawing the body portion into fluid-tight engagement with the surface of the main line. Thus, stirrups or bails are commonly employed to surround the main line and to engage portions of the body to draw it against the line. Gaskets formed from lead, rubber, or like material are used for insuring a fluid-tight seal.

While saddles of various types have been extensively used and are effective for their intended purpose, the relatively rapid corrosion of such saddles in service has presented a serious problem and has represented a significant maintenance expense. Such corrosion attack has been found to be almost entirely of electrical origin and to result from the passage into the branch line of electrical currents flowing along the main line, or vice versa. Since pipe lines with which saddles are commonly used are buried in the ground, they tend to pick up electrical currents which emanate from a variety of sources such as the tracks of electric railway systems, industrial power grounds, induced currents from parallel lines, chemical action of soils of different compositions along the route of the pipe line, galvanic action between different metals, e. g. the metal of the saddle and the metal of the main line pipe, and the like. Such currents are, therefore, an almost ever-present threat to the pipe line and saddles are particularly receptive to such corrosion attack for the reason that they present a discontinuity of structural elements composed of projecting members and edges. The electrical currents set up an electrolytic reaction between the metal of the pipe and the soil surrounding it, and when the current is allowed to flow unrestrictedly through the saddle this electrolytic action soon causes serious damage and failure of the saddle. Furthermore, not only the saddles are damaged by such electrolytic action but the adjacent portions of the main line pipe and the branch line pipe are attacked as well. A major practical problem in the use of pipe saddles is, consequently, the adequate protection of these fittings from the destructive action of the electric currents encountered in service. It is of great practical importance to reduce to a minimum the need for repair or replacement of the saddles or other portions of the lines, since such maintenance is expensive and time consuming and necessitates costly interruptions in service.

In pipe lines constructed with flexible compression couplings, it has been proposed to impede the flow of electrical currents along the lines by the use of so-called insulating couplings. Such insulating couplings, however, do not solve the problem of corrosion attack of saddles and saddles are very commonly used in connection with pipe lines formed from pipe sections joined by conventional non-flexible, non-insulating couplings. To my knowledge, no proposal for effectively insulating a saddle from attack by electrical currents has heretofore been made.

It is the principal object of this invention to provide an electrically-insulating pipe saddle.

It is another object of the invention to provide a saddle of the character indicated which effectively prevents the flow of electrical currents between the main line pipe and the branch line pipe to which it is joined.

According to the invention, I provide an insulating pipe saddle comprising a body portion having a threaded aperture for receiving the branch line pipe and having an arcuate inner face conforming to the curvature of the exterior surface of the main line pipe, a secondary or clamping portion adapted, in conjunction with the body portion, to surround the main line pipe and to draw the body portion against the surface of the pipe, and insulating means adapted to be disposed between the body portion and the main line pipe and between the clamping portion and the body portion. The insulating means between the body portion and the pipe is formed from an elastic, electrically-insulating material and comprises an apertured sheet-like element, while the insulating means between the body portion and the clamping portion of the saddle comprises a combination of elastic or non-elastic insulating sleeves and washers. In the preferred embodiment of my invention, the clamping portion is in the form of bails or stirrups and the pipe-engaging insulating means is formed from a resilient, elastic, hydrocarbon-resistant rubbery material.

Other objects and features of the invention will be apparent from the following detailed description of illustrative embodiments of my insulating saddle and from the accompanying drawings, wherein, Fig. 1 is an end elevation, partly in section to show details of the stirrup insulating arrangement, of an insulating pipe saddle embodying features of the invention;

Fig. 5 is a fragmentary end elevation, partly in section, showing the stirrup insulating arrangement of another embodiment;

Fig. 6 is a similar view of another embodiment;

Fig. 7 is a similar view of a modified form of the insulating arrangement shown in Fig. 6;

Fig. 8 is an end elevation, partly in elevation of another embodiment having a modified form of clamping means; and Fig. 9 is a side elevation of the insulating saddle shown in Fig. 8.

Figure 1:
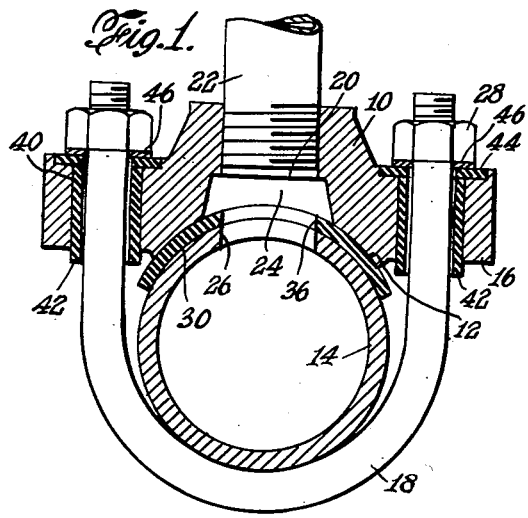
Figure 2:
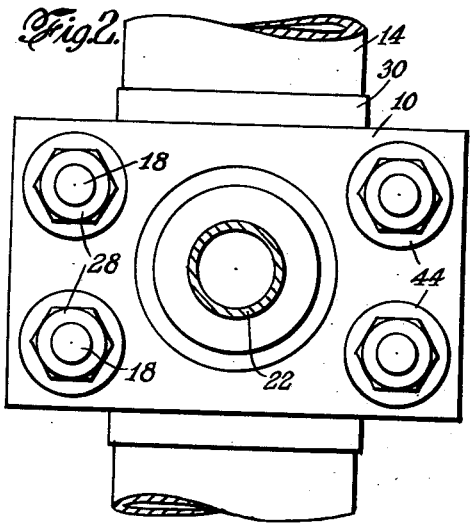
Fig. 2 is a plan view of the insulating saddle shown in Fig. 1.

Referring to the drawings, and particularly to Figs. 1 and 2, the numeral 10 designates the body portion of one illustrative embodiment of my insulating saddle. The body 10, which is suitably formed from steel, cast-iron, or other metal, has an inner arcuate face 12 having a curvature conforming substantially to that of the exterior surface of the main line pipe 14 upon which it is installed and has wing portions 16 which are suitably apertured to receive the ends of the stirrups 18. The body 10 is provided with a central threaded aperture 20 in which is received the threaded end of a branch line pipe 22, the aperture 20 terminating in a slightly enlarged unthreaded recess 24 formed in the face 12. The recess 24 communicates with an aperture 26 in the pipe 14, which may be formed in the pipe before installation of the saddle but which is preferably formed after installation. The stirrups 18 are provided with nuts 28 which serve to draw the stirrups and the body portion 10 together around the main line pipe 14. The face 12 of the body portion 10 and of the stirrups are suitably dimensioned to fit any of the sizes of pipe produced commercially and used for the construction of gas lines and the like. It is known that in practice pipes vary to some extent from what may be termed the "nominal" external diameter, some being of slightly greater diameter and others being of somewhat lesser diameter, i. e. varying from what may be termed a "maximum" pipe to what may be termed "minimum" pipe. The insulating pipe saddle of my invention is of a construction which adapts it to be used with equal effectiveness both with maximum pipe and with minimum pipe, as will be apparent as the description proceeds.

It is a feature of my invention that the saddle is electrically insulated from the main line pipe in such a way that flow of electrical current through the saddle between the main pipe and the branch pipe is prevented. For this purpose I provide two separate insulating means, one to insulate the body portion of the saddle from the main line pipe and the other to insulate the body portion from the clamping elements, e. g. the stirrups 18. Referring to Figs. 1 and 2, the first-named insulating means comprises an insulating sheet 30 disposed between the exterior surface of the main line pipe 14 and the arcuate face 12 of the body portion 10. The insulating sheet 30 extends over the entire arcuate inner face 12 of the saddle body portion 10 and projects beyond the margin thereof a distance greater than the thickness of said sheet so as to protect against the flow of electrical currents between the saddle body and the pipe. The sheet 30 is provided with an aperture 36 positioned to coincide substantially with the aperture 26 in pipe 14 and the recess 24 of the saddle body portion 10. As seen in Fig. 1, the hole 36 in the insulating sheet 30 is of approximately the size of the aperture 26 in pipe 14 and the aperture 20 for the branch line pipe 22, but is smaller than the recess 24 so that the edge portions of the insulating sheet around the hole 36 project inwardly beyond the edge of said recess and protect against the flow of electrical currents from the branch line pipe or saddle body to the edges of the hole 26 in the pipe.

The insulating sheet 30 is formed from rubber or rubber composition, this term being used generically to include natural and synthetic rubbers and elastomeric compounds, or compositions having like properties and characteristics. The material is relatively firm and solid but sufficiently resilient and elastic to flow under pressure to conform to the surfaces between which it is confined. Preferably, the insulating sheets are formed from a rubbery composition which is relatively resistant to attack by hydrocarbon gases and oils. Examples of such resistant rubbery compositions suitable for use with my saddle are neoprene (polychloroprene) and butadiene-acrylonitrile co-polymers, such as those known commercially by the trade designations Buna-N or GR-A. My invention is not limited to these specific materials, and particularly when special resistance to gases and oils is not required, any rubbery composition having the above-noted characteristics may be employed.

To prevent electrically-conductive contact between the body portion 10 and the clamping elements, e. g. the stirrups 18, of my insulating saddle, I provide a combination of insulating sleeves and washers. Thus, referring to Figs. 1 and 2, the apertures 40 in the wings 16 have a diameter sufficiently greater than the diameter of the threaded ends of the stirrups 18 to accommodate an insulating sleeve 42, and insulating washers 44 are placed under the nuts 28. It will be understood that the aperture in the washers 44 is sufficiently large to receive the shaft of the stirrup 18 and the washer is preferably of sufficient radial thickness to extend outwardly at least to the periphery of the nuts 28. The sleeves 42 and the washers 44 may be formed from a resilient, elastic material of the type used for the insulating sheet 30 or they may be formed from a rigid material such as ebonite, i. e. so-called hard-rubber, or from fibrous materials impregnated with a thermo-setting resin such as a phenol-formaldehyde resin, or like rigid, insulating materials. The sleeves and washers may be made by molding, stamping, or other process known in the art.

It is generally advantageous, particularly when the washers 44 are formed from a resilient material, e. g, a rubber composition, to place a metal washer between the nut 28 and the insulating washer 44 to prevent injury to the latter when the nut is tightened upon the stirrup. Thus, as shown in Fig. 1, a metal washer 46 protects the insulating washer 44 from frictional engagement with the nut 28.

Figure 3:
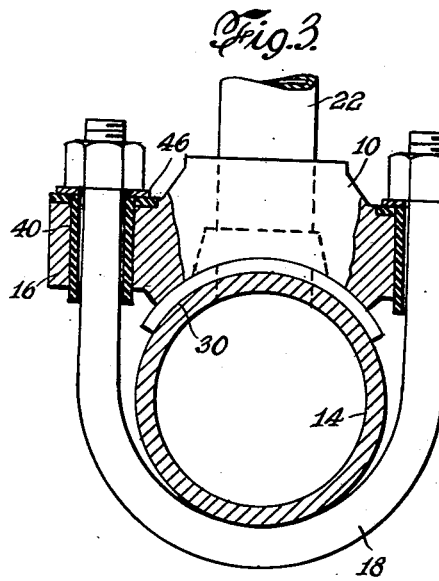
Fig. 3 is an end elevation, partly in section, of another embodiment of the invention.

While in the embodiment shown in Fig. 1, the insulating washer 44 rests upon the top edge of the sleeve 42, I may, as shown in Fig. 3, employ an insulating washer 48 having an aperture sufficiently large to accommodate not only the shaft of the stirrup 18 but also the sleeve 42 as well. As in the saddle structure of Fig. 1, a metal washer 46 protects the insulating washer 48 and the sleeve 42 from injury by the nut 28.

Figure 4:
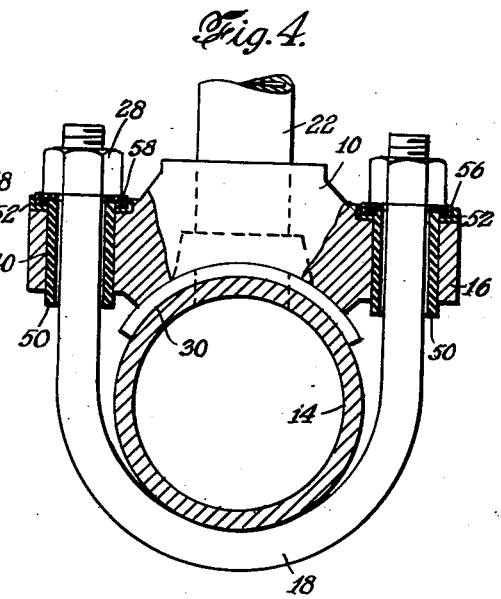
Fig. 4 is a similar view showing the construction of another embodiment of the invention.

Similarly, in further embodiments of my invention I provide other combinations of insulating sleeves and washers to insure a non-conductive connection between the body portion 10 and the stirrups 18 of the saddle. Referring, for example, to Fig. 4, I provide, in combination with a body portion 10 and stirrups 18 as shown in Figs. 1–3, an insulating sleeve 50 similar in construction to sleeves 42 and adapted to be received in the apertures 40 of the wings 16. Positioned around sleeve 50 and resting upon the top surface of wing 16 is a cup-shaped metal washer 52 having an upwardly directed flange portion 54. Also surrounding sleeve 50 and seated in metal washer 52 is a cup-shaped insulating washer 56 which, like sleeve 42, may be formed from a resilient elastic material or from a rigid insulating material. A flat metal washer 58, similar to washer 46 of Fig. 1, separates the nut 28 from the top edge of sleeve 50 and the surface of insulating washer 56. In this construction, the metal washer 58 prevents injury to the sleeve 50 and the insulating washer 56 upon rotation of nut 28 and the cup-shaped metal washer 52 serves as a retainer means to prevent displacement of the insulating washer 56 when nut 28 is tightened. In Fig. 5 is shown a modified form of the arrangement of Fig. 4, wherein the insulating sleeve 50 and the insulating washer 56 are combined as a single integral insulating unit 60.

In the embodiment shown in Fig. 6, the cup-shaped insulating washer 56 of the embodiment shown in Fig. 4 is replaced by a relatively thick insulating washer 65. This type of construction is desirable where it is advantageous to provide a resilient connection between the stirrups 18 and the body portion 10, for example, when the main line pipe 14 or the branch pipe 22 are subject in service to substantial vibration or flexing. In this case, the insulating washer 65 is formed from a relatively resilient material of the character above described in connection with the insulating sheet 30. Thus, in the embodiment of Fig. 6, the cup-shaped metal washer 52 rests upon the top of insulating sleeve 50, and the resilient insulating washer 65 is seated in cup-shaped washer 52 and prevented from undue outward displacement upon tightening of nut 28 by the upwardly-extending flange 66 of washer 52. The flat metal washer 58 prevents frictional injury to resilient washer 65 when nut 28 is tightened.

In the embodiment shown in Fig. 7 a structure is provided similar to that shown in Fig. 6 except that the flat metal washer 58 is replaced by a cup-shaped metal washer 68 having a downwardly-extending flange portion 70. The various elements are so dimensioned that a clearance is provided between the flange 70 of the cup-shaped washer 68 and the flange 66 of the cup-shaped washer 52. This combination of cup-shaped washers provides an enclosure for the resilient insulating washer 65 and insures against lateral displacement of the relatively resilient material upon tightening of the nut 28.

While various embodiments of my insulating saddle have been described, it will be apparent that in each embodiment the specific combination of insulating sleeves and insulating washers provides an effective non-conducting connection between the body portion 10 of the saddle and the clamping portion or stirrups 18.

To apply the insulating saddle of the type shown in Figs. 1 to 7, it is merely necessary to place the stirrups 18 around the main line pipe 14, to place the body portion and the insulating sheet 30 in position over the stirrups so that the free ends of the stirrups extend through the apertures 40 in the wings 16, to place the insulating sleeves and the insulating and metallic washers around the upper ends of the stirrups as shown in the drawings, and then to tighten the nuts 28 to the desired degree upon the threaded ends of the stirrups. As previously indicated, the aperture 26 in the pipe 14 may be formed before the installation of the saddle or may be made after installation. In the later case, after the saddle has been applied as just described, a drilling tool is inserted through the aperture 20 of the body 10 and the aperture 26 drilled. The branch line pipe 22 is then screwed into the threaded aperture 20 and the installation is complete. It will be observed that in the installed saddle metal-to-metal contact between the main line pipe 14 and the body portion 10 of the saddle is prevented by the insulating sheet 30 and the described arrangement of insulating sleeves and washers which separates the ends of the stirrups 18 from the body portion 10. It will also be observed that the insulating sheet 30 not only serves as an insulating member but also simultaneously serves as a fluid-tight sealing medium which prevents the escape of any of the gas or liquid flowing from the pipe 14 through the saddle into the branch line 22. When the saddle is applied, the sheet 30 is placed into sealing engagement between the surface of pipe 14 and the face 12 of the saddle body portion 10. Being formed from a resilient, elastic material, the sheet 30 is conformed to the surfaces between which it is compressed, whether maximum or minimum pipe is employed, and a fluid-tight seal is effected. The aperture 36 is preferably formed in the elastic sheet 30 before application or it may be formed by the drilling tool simultaneously with the formation of the aperture 26 in main line pipe 14.

While I have thus described the invention with respect to a saddle in which stirrups 18 are employed as the clamping means for drawing the body portion 10 into sealing engagement with the surface of the main line pipe 14, it will be apparent that the invention is applicable to saddle constructions having clamping means of other types. Thus, referring to Figs. 8 and 9, the embodiment shown comprises a body portion 10 substantially like that of the embodiment shown in Fig. 1 but the stirrups of Fig. 1 are replaced by a clamp plate 80 and bolts 82. Clamp plate 80 is formed with an arcuate recess 84 adapted to conform to the curvature of the pipe 14 and has wing portions 86 which are provided with apertures for receiving the bolts 82. The bolts 82 pass through the apertures 40 in the wings 16 of the body portion 10 and are engaged by nuts 88. The bolts 82 are insulated from the body portion 10 in the same manner employed in connection with the stirrups 18, for example, the arrangement shown in Fig. 1 consisting of an insulating sleeve 42, an insulating washer 44 and a metal washer 46. A rib 90 is formed on the outer surface of plate 80 between the wings 86 in order to provide it with sufficient resistance to bending when the nuts 88 are tightened upon the bolts 82 during installation of the saddle.

While I have fully described and illustrated my invention with reference to the several embodiments thereof shown in the drawings, it will be obvious to those skilled in the art that various changes and modifications may be made in the structural embodiment of the invention without departing from the scope thereof as defined in the appended claims, and it is intended therefore that all matter contained in the foregoing description and in the drawings shall be interpreted as illustrative and not in a limiting sense.

What I claim and desire to secure by Letters Patent is:

1. An insulating pipe saddle adapted to provide an electrically non-conductive connection between a branch line pipe and a main line pipe when said pipes are above ground and when said pipes are below ground and buried in the soil, comprising, in combination, a body portion having a threaded aperture for receiving the branch line pipe, an arcuate inner face adapted to conform to the curvature of the exterior surface of the main line pipe and a recess in said arcuate inner face coaxial with said aperture and of larger cross section than said aperture so that said recess forms an enlarged continuation of said aperture, an insulating sheet formed from a non-conductive, resilient material disposed against the arcuate face of said body portion to separate said face from the surface of the main line pipe, said insulating sheet preventing all electrically-conductive contact between said body portion and said main line pipe and extending over all of said arcuate inner face and beyond the margins thereof a distance greater than the thickness of said sheet between said main line pipe and said body portion, said insulating sheet having a hole in alignment with said aperture, said hole being of a size approximately equal to the cross section of said aperture and smaller than said recess so that the edges of said hole project inwardly beyond the edges of said recess, said body portion having integral side extensions provided with apertures, clamp-ing means having end portions engageable with said side extensions for drawing said body portion into fluid-tight engagement with the main line pipe, said clamping means comprising pairs of bolts extending through the aperture in said side extensions, insulating means disposed on said bolts for preventing electrically-conductive contact between said bolts and said body portion, said insulating means comprising sleeves of non-conductive material disposed in the apertures of said side extensions and on said bolts, and rings of non-conductive material arranged on said bolts adjacent the top of said sleeves, nuts engaging the ends of said bolts, and metallic washers disposed below said nuts in engagement with said rings of non-conductive material, the length of each sleeve being substantially greater than the distance from the top of said sleeve to the bottom of the associated aperture, whereby each sleeve extends below said side extensions a distance greater than the thickness of said sleeves.

2. In a pipe line, including a main line pipe and a branch line pipe, an insulating pipe saddle providing an electrically non-conductive connection between the branch line pipe and the main line pipe when said pipes are above ground and when said pipes are below ground and buried in the soil, comprising, in combination, a body portion having a threaded aperture receiving the branch line pipe, an arcuate inner face conforming to the curvature of the exterior surface of the main line pipe and a recess in said arcuate inner face coaxial with said aperture and of larger cross section than said aperture so that said recess forms an enlarged continuation of said aperture, an insulating sheet formed from a non-conductive, resilient material disposed against the arcuate face of said body portion to separate said face from the surface of the main line pipe, said insulating sheet preventing all electrically-conductive contact between said body portion and said main line pipe and extending over all of said arcuate inner face and beyond the margins thereof a distance greater than the thickness of said sheet between said main line pipe and said body portion, said insulating sheet having a hole in alignment with said aperture, said hole being of a size approximately equal to the cross section of said aperture and smaller than said recess so that the edges of said hole project inwardly beyond the edges of said recess, said body portion having integral side extensions provided with apertures and annular recesses at the upper ends of said apertures, clamping means having end portions engageable with said side extensions for drawing said body portion into fluid-tight engagement with the main line pipe, said clamping means comprising pairs of bolts extending through the apertures in said side extensions, insulating means disposed on said bolts for preventing electrically-conductive contact between said bolts and said body portion, said insulating means comprising sleeves of non-conductive material disposed in the apertures of said side extensions and on said bolts, and rings of non-conductive material arranged on said bolts adjacent the top of said sleeves and seated in said annular recesses, nuts engaging the ends of said bolts, and metallic washers disposed below said nuts in engagement with said rings of non-conductive material, the length of each sleeve being substantially greater than the distance from the top of said sleeve to the bottom of the associated aperture, whereby each sleeve extends below said side extensions a distance greater than the thickness of said sleeves.

References Cited in the file of this patent

UNITED STATES PATENTS

| Number | Name | Date |
|---|---|---|
| 45,964 | Ball | Jan. 24, 1865 |
| 501,021 | McCarthy | July 4, 1893 |
| 921,247 | Herrick | May 11, 1909 |
| 982,028 | Austin | Jan. 17, 1911 |
| 998,926 | Sheehan et al. | July 25, 1911 |
| 1,545,493 | Hoffman | July 14, 1925 |
| 1,592,175 | Boyd | July 13, 1926 |
| 2,179,476 | Andrus | Nov. 14, 1939 |
| 2,269,695 | Scharf | Jan. 13, 1942 |
| 2,316,974 | Risley | Apr. 20, 1943 |
| 2,359,239 | Newton | Sept. 26, 1944 |
| 2,512,009 | Bober | June 20, 1950 |

FOREIGN PATENTS

| 934,088 | France | Jan. 7, 1948 |